Patented May 17, 1938

2,117,366

UNITED STATES PATENT OFFICE

2,117,366

COATING MATERIAL

Harold F. Saunders and Charles Donald Downs, Chicago, Ill., assignors to The Sherwin-Williams Company, Cleveland, Ohio, a corporation of Ohio No Drawing. Application December 7, 1935, Serial No. 53,428

5 Claims. (Cl. 134—58)

This invention relates to the treatment of pigments and the like, and particularly to the neutralization of the effect of adsorbed water thereon.

It is well known that a relatively high degree of dehydration of pigments may be accomplished in the process known as "pulping" which comprises the replacement of water from an aqueous suspension of the pigment, such as is obtained in precipitation, aqueous quenching, or other process operation, by a liquid substantially non-miscible with water; and that in such pulping process elimination of water down to 0.5 to 2% of the "pulp" is the practical limit to which water is removed. To effect as large a percentage of replacement as this, special agents are resorted to, which by contact with the pigment, cause it to wet preferentially in oil rather than water. Some of the agents frequently used are drying oil fatty acids, soaps, sodium phosphate, borates, resinates, resins, amides or alcohols, naphthenic acid, and the like.

Theoretically, complete replacement of water can be obtained; but this complete replacement is never reached in commercial practice, since the pigment particles are frequently somewhat coalesced into aggregates and the treating agents are unable to reach the surfaces of the interior particles of these aggregates. In addition, the water-immiscible liquids will in themselves retain a certain percentage of water in a partially emulsified condition.

The pigment dehydrated by a pulping process possesses some very distinct advantages over the same pigment dehydrated by the customary procedure of filtration and drying; since the latter introduces certain physical and chemical changes, disadvantageously affecting color, opacity, texture and wettability. For this reason, the pulping process of dehydration is commonly resorted to wherever the unavoidable presence of the small amount of water is not considered harmful.

Thus, for example, pulped white lead in linseed oil, commonly referred to as "lead-in-oil" is a standard commercial article, its major use being for exterior house paints by further addition of drying oils, thinners, and driers.

The use of pulped pigments has not heretofore been practicable when further reduction was to be made with bodied oils, varnishes, natural or synthetic gums, and the like, because the water present in the pulp produced a livering or clabbering by change in the solubilities of these materials so that they would leave solution and curdle.

Use of the zinc sulphide pigments, such as lithopone and similar high opacity pigments, in pulped form, has hitherto been limited since not only does the pulping of these pigments result in the higher proportions of water, upwards of 1%, but these pigments are, in the main, utilized for special interior finishes where bodied oils, treated oils, varnishes and varnish gums are considered essential to obtain certain desirable effects in brushing, gloss or flatness, film hardness and the like.

From a theoretical standpoint, water which is retained adsorbed on the surface of hydrophilic particles does not as such emulsify to form the internal phase of an emulsion in the water-immiscible liquid, but this internal phase consists of the combined pigment plus adsorbed water. The apparent effect on the pulp is a shortness, or a short-flow grainy-appearing paste. Further addition or retreatment with the usual treating agents previously mentioned does not change this effect or appearance, since the emulsion is already stabilized, and the water not far from the natural solubility of water in the liquid, hence it cannot be removed or replaced and there is no tendency for it to leave the pigment particle.

We have discovered that when a substance such as lecithin, obtained from soya bean oil, or a modification of lecithin, obtained by heating, bleaching, purifying, or otherwise treating either soybean or other lecithin, is added to the pulp in a small proportion of approximately 0.5 to 2.0%, a modification of the emulsion is obtained and an immediate visible change takes place, the pulp becoming noticeably of a long, easy flow and losing the grainy appearance. Further, when such pulp is reduced with the aforementioned bodied oils, heat-treated oils, varnishes or varnish gums, which are intended to be referred to in the claims by the expression "oil paint vehicle", they are not curdled and their natural properties remain unaffected.

The percentage of lecithin required is not critical. Partial effect is obtained where lower percentages than specified are used, and a greater amount may be used, but since the desired result is obtained within the range specified, any excess is merely wasted.

The superior qualities of the pulped pigment, such as fine texture and softness, a high degree of whiteness or color and markedly higher opacity, are thus made available.

As an example of the practice of this invention:

Two pounds of lecithin are added to 100 lbs. of a lithopone pulp carrying approximately 1½% of water and obtained by replacement of water from an aqueous suspension of lithopone by a liquid consisting essentially of 98% mineral spirits and 1½% linseed oil, and ½% linseed oil fatty acids. The paste thus made is stirred until the lecithin is well dispersed. An immediate reduction of the short flow is apparent.

The superiority of this product made in accordance with our invention is shown by the following comparative tests:

1. 1010 lbs. of lithopone, dried in the usual manner, was made up into a flat wall finish with the usual flat liquids.

2. An attempt to make a flat wall finish with the same liquids as in No. 1, but using pulped lithopone instead of the dried lithopone, failed because a curdy paste resulted.

3. A flat wall finish was made with the same liquids as in No. 1 and No. 2 but using lithopone in lecithin-treated pulp form equivalent to only 910 lbs. of lithopone on the dry base.

On painting similar surfaces in the usual way with No. 1 and No. 3, not only was No. 3 whiter than No. 1 but it showed markedly greater covering power.

The two paints were then carefully measured on an opacimeter using the Marten's photometer in accordance with the Bureau of Standards method in Technical Paper No. 306, dated January 16, 1926, where it was found that whereas 10.5 lbs. of pigment in No. 1 were required to bring 500 square feet of surface from black to a contrast ratio of 96, in the case of No. 3, only 8.94 lbs. of pigment were required for the same area.

The difference per pound of lithopone prepared by the two methods is, therefore:

```
                              Sq. ft. per lb. of pigment
                              black to 96 contrast ratio
Regularly dried lithopone_____ 47.6
Pulped lithopone_____ 55.9
```

Having thus described our invention, what we claim is:

1. A coating composition consisting of an oil paint vehicle, a drier, pigment material and lecithin, said pigment material comprising a "pulped" pigment containing a small percentage of water and the amount of the lecithin being between one-half and two per cent, by weight, of said pigment.

2. A coating composition consisting of an oil paint vehicle, a drier, pigment material and lecithin, said pigment material comprising "pulped" lithopone containing less than two per cent of water and the amount of lecithin being between one-half and two per cent, by weight, of said lithopone.

3. A "pulped" pigment, for coating compositions, having a water content of less than two per cent and having incorporated therewith in a state of complete dispersion an amount of lecithin which is from one-half to two per cent, by weight, of the pigment.

4. A "pulped" lithopone having a water content of less than two per cent and having incorporated therewith in a state of complete dispersion an amount of lecithin which is from one-half to two per cent, by weight, of lithopone.

5. The herein described method of improving the covering power of an oil-emulsified "pulped" pigment for paints, having a water content not in excess of two per cent of the pigment, by weight, which consists in adding thereto and completely dispersing therein an amount of lecithin which is from one-half to two per cent, by weight, of the pigment.

HAROLD F. SAUNDERS.
CHARLES DONALD DOWNS.